(12) United States Patent
Taillefer

(10) Patent No.: US 8,196,123 B2
(45) Date of Patent: Jun. 5, 2012

(54) OBJECT MODEL FOR TRANSACTIONAL MEMORY

(75) Inventor: Martin Taillefer, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1379 days.

(21) Appl. No.: 11/821,838

(22) Filed: Jun. 26, 2007

(65) Prior Publication Data

US 2009/0007057 A1    Jan. 1, 2009

(51) Int. Cl.
*G06F 9/44* (2006.01)

(52) U.S. Cl. ......... 717/149; 717/104; 717/120; 717/122

(58) Field of Classification Search .................. None
See application file for complete search history.

(56) References Cited

U.S. PATENT DOCUMENTS

| | | | |
|---|---|---|---|
| 5,157,777 A | 10/1992 | Lai et al. | |
| 5,999,987 A | 12/1999 | O'Farrell et al. | |
| 6,085,035 A | 7/2000 | Ungar | |
| 6,138,269 A | 10/2000 | Ball | |
| 6,553,384 B1 | 4/2003 | Frey et al. | |
| 6,654,760 B2 | 11/2003 | Baskins et al. | |
| 6,826,757 B2 | 11/2004 | Steele, Jr. et al. | |
| 7,058,954 B1 | 6/2006 | Wollrath et al. | |
| 7,076,784 B1 | 7/2006 | Russell et al. | |
| 7,809,525 B2* | 10/2010 | Chagoly et al. | 702/182 |
| 7,827,135 B2* | 11/2010 | Leff et al. | 707/610 |
| 2002/0103970 A1 | 8/2002 | Gut | |
| 2002/0198895 A1 | 12/2002 | Arnold | |
| 2004/0215589 A1* | 10/2004 | Boyd et al. | 707/1 |
| 2004/0267828 A1* | 12/2004 | Zwilling et al. | 707/200 |
| 2005/0097564 A1* | 5/2005 | Laura | 719/312 |
| 2005/0120036 A1* | 6/2005 | Verma et al. | 707/100 |
| 2005/0149525 A1* | 7/2005 | Verma et al. | 707/8 |
| 2005/0289212 A1* | 12/2005 | Tankov et al. | 709/200 |
| 2006/0026379 A1* | 2/2006 | Jung | 711/170 |
| 2006/0041872 A1* | 2/2006 | Poznanovic et al. | 717/140 |
| 2007/0136365 A1* | 6/2007 | Tarditi et al. | 707/103 R |
| 2007/0168929 A1 | 7/2007 | Larvet | |
| 2008/0034359 A1* | 2/2008 | Duffy et al. | 717/152 |
| 2009/0006407 A1* | 1/2009 | Magruder et al. | 707/8 |

FOREIGN PATENT DOCUMENTS

| | | |
|---|---|---|
| CN | 1983172 | 11/2006 |
| GB | 2239334 A | 6/1991 |

OTHER PUBLICATIONS

International Search Report, Serial No. PCT/US2008/066781, dated Oct. 31, 2008, 13 pages.
Herlihy, et al., "Software Transactional Memory for Dynamic-Sized Data Structures," Date: Jul. 13-16, 2003. pp. 1-10.

(Continued)

*Primary Examiner* — Isaac Tecklu

(57) ABSTRACT

Various technologies and techniques are disclosed for providing an object model for transactional memory. The object model for transactional memory allows transactional semantics to be separated from program flow. Memory transaction objects created using the object model can live beyond the instantiating execution scope, which allows additional details about the memory transaction to be provided and controlled. Transactional memory can be supported even from languages that do not directly expose transactional memory constructs. This is made possible by defining the object model in one or more base class libraries and allowing the language that does not support transactional memory directly to use transactional memory through the object model.

20 Claims, 12 Drawing Sheets

OTHER PUBLICATIONS

Shaughnessy, Managed Code Database Advantage for the Microsoft .NET Framework Platform, Date: Sep. 11-15, 2004, http://bdn1.borland.com/borcon2004/article/paper/0,1963,32236,00.html.

Chinese Voluntary Amendment, Application No. 200880022262.0 mailed Jul. 14, 2010, 7 pages.

European Response to Written Opinion, Application No. 08 770 896.2 mailed Dec. 13, 2010, 14 pages.

Extended EP Search Report dated Jun. 8, 2010 for Application No. 08770896, 9 pages.

Herlihy, M., et al., "Transactional Memory: Architectural Support for Lock-Free Data Structures", Computer Architecture News, ACM New York, NY, US LNKD- DOI:10.1145/173682.165164, vol. 21, No. 2, May 1, 1993, XP000380375 ISSN: 0163-5964, pp. 289-300.

Moss, J.E.B., et al., "Nested Transactional Memory: Model and Architecture Sketches", Science of Computer Programming, Elsevier Science Publishers BV., Amsterdam, NL LNKD- DOI:10.1016/J.SCICO.2006.05.010, vol. 63, No. 2, Dec. 1, 2006, XP025072634, ISSN: 0167-6423, pp. 186-201.

Chinese Office Action, Application No. 200880022262.0 mailed Sep. 15, 2011, 13 pages.

Response to Chinese Office Action, Application No. 200880022262.0 mailed Dec. 2, 2011, 11 pages (including translated marked-up claims).

* cited by examiner

```
310
    enum MemoryTransactionType
    {
        TopLevel,
        Nested,
312 }
    class MemoryTransaction
    {
314     // constructors to create all types of transactions
316     MemoryTransaction();                          // top-level transaction
        MemoryTransaction(MemoryTransaction parent);  //nested
318                                                   //transaction
        // methods to read & write
        bool Write(ref int storage, int value);
        bool Write(ref float storage, float value);
        bool Read(ref int storage, out int value);
        bool Read(ref float storage, out float value);
320     // etc...
        // transaction control
        void Rollback();
322     bool Commit();
        // properties to return the current ambient transaction
        //hierarchy
324     static MemoryTransaction CurrentTransaction { get; }
        // thread-local value
        MemoryTransaction ParentTransaction { get; }
        MemoryTransactionType TransactionType { get; }
    }
```

```
void main()
{
    MemoryTransaction tx;

// create a new transaction object
402 tx = new MemoryTransaction();

// start MyThread as a separate thread of execution
404 StartThread(MyThread, tx)

atomic (tx)
    {
        // contribute to the "tx" transaction
        tx.Write(ref y, 2);
    }
}

// a method that gets run as a thread
void MyThread(MemoryTransaction tx)
{
    atomic (tx)
    {
        // contribute to the "tx" transaction
        tx.Write(ref x, 2);
    }
}
```

```
atomic
{
    // Suspend the transaction
    transaction_suspend;
}
onsuspend (MemoryTransaction tx)
{
    // snapshot the suspended transaction
    suspendedTx = tx;
}

// resume the transaction that was suspended above
atomic (suspendedTx)
{
}
```

FIG. 11

OBJECT MODEL FOR TRANSACTIONAL MEMORY

BACKGROUND

Steadily over time computers have become much more powerful, with more processing power and memory to handle advanced operations. This trend has recently shifted away from a focus on ever-increasing single-processor clock rates and towards an increase in the number of processors available in a single computer. Software developers want to take advantage of improvements in computer processing power, enabling their software programs to be executed faster as new hardware is adopted. With the new hardware trends, however, this requires a different approach: developers must arrange for one or more tasks of a particular software program to be executed "concurrently" (sometimes called "in parallel"), so that the same logical operation can utilize many processors at one time, and deliver better performance as more processors are added to the computers on which such software runs.

Transactional memory is designed to ease development of concurrent programs by providing atomicity and isolation to regions of program code. Transactional memory (TM) is a concurrency control mechanism analogous to database transactions for controlling access to shared memory in concurrent computing. A transaction in the context of transactional memory is a piece of code that executes a series of reads and writes to shared memory. TM is used as an alternative to traditional locking mechanisms. TM allows concurrent programs to be written more simply. A transaction specifies a sequence of code that is supposed to execute as if it were executing in isolation. This illusion of isolation is achieved by fine-grained locking of objects, and by executing in a mode that allows the effects of the transaction to be rolled back if the transaction is discovered to be in conflict with some other transaction. We say that a data access is "transacted" if the access is protected by these locking and rollback mechanisms.

Existing transactional memory systems use a simple language construct for defining transactions. These transactions are instantiated implicitly through scope-based language constructs that declare the start and end of an atomic block of code, such as the following example:

```
atomic
{
    ...statements to execute in the transaction go here...
}
```

This current approach to transactional memory requires that the transaction be tied to a specific part of the program flow, and is only supported by programming languages that have been upgraded to include explicit transactional semantics and associated constructs.

SUMMARY

Various technologies and techniques are disclosed for providing an object model for transactional memory. The object model for transactional memory allows transactional semantics to be separated from language scoping rules. Memory transaction objects created using the object model can live beyond the nominal scope associated with a traditional atomic block, allowing new usage models and additional functionality compared with scope-based atomic blocks.

In one implementation, transactional memory semantics can be supported even from languages that do not directly support transactional memory constructs. This is made possible by defining the object model in one or more base class libraries and allowing the languages that do not support transactional memory directly to use transactional memory through the object model.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 6 is a diagram illustrating an example of a skeletal definition of a memory transaction class of one implementation.

FIG. 9 is a diagram illustrating some exemplary source code for using the object model to create a single transaction with multiple threads that contribute to performing the work for the single transaction.

FIG. 11 is a diagram illustrating some exemplary source code that suspends a transaction and resumes it at a later time.

DETAILED DESCRIPTION

Figure 1:
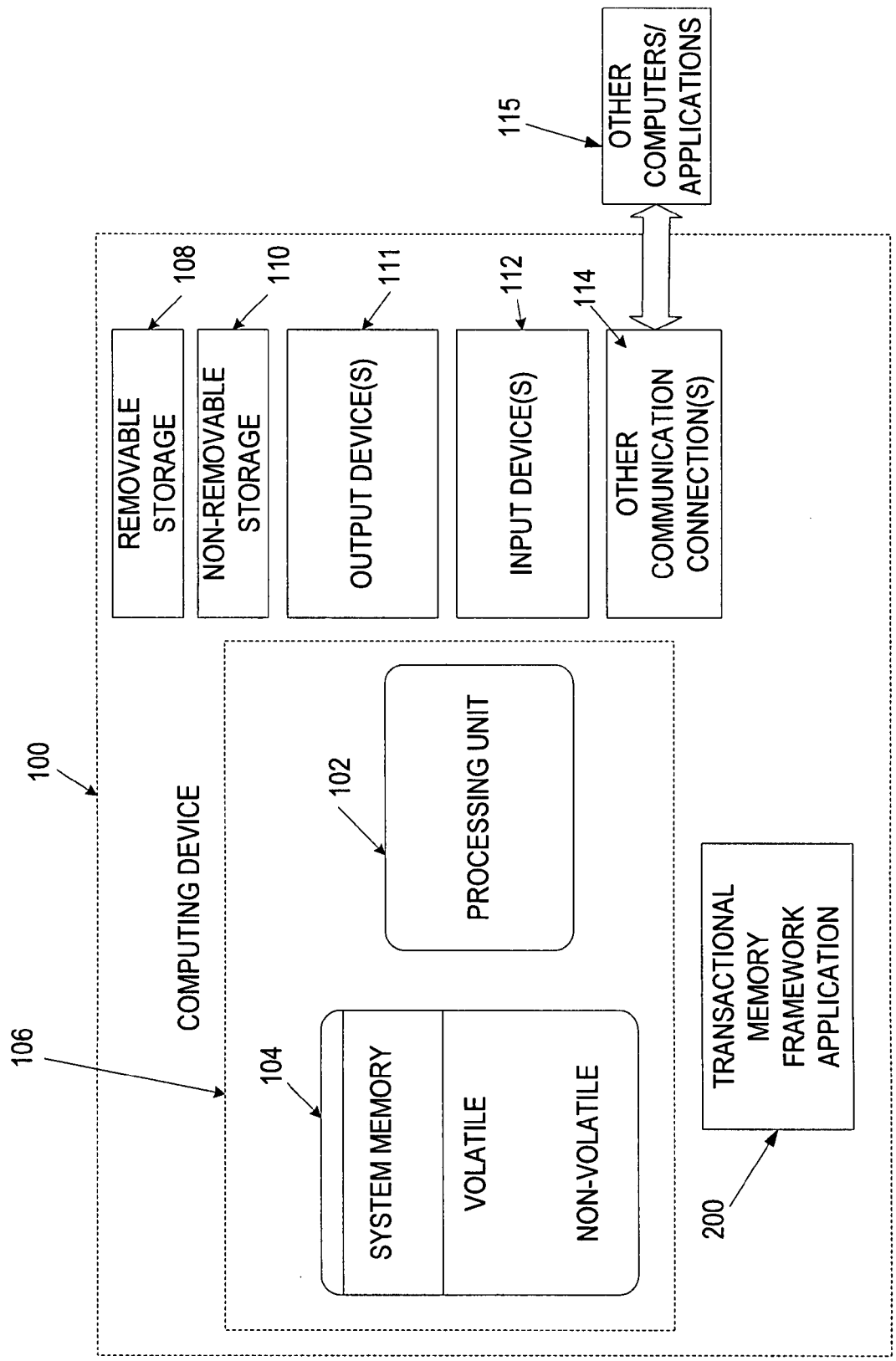
FIG. 1 is a diagrammatic view of a computer system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as a framework for providing an object model for transactional memory, but the system also serves other purposes in addition to these. In one implementation, one or more of the techniques described herein can be implemented as features within a framework or platform such as MICROSOFT®.NET, Java Virtual Machine, or from any other type of program or service that provide platforms for running applications using transactional memory systems.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes transactional memory framework application 200. Transactional memory framework application 200 will be described in further detail in FIG. 2.

Figure 2:
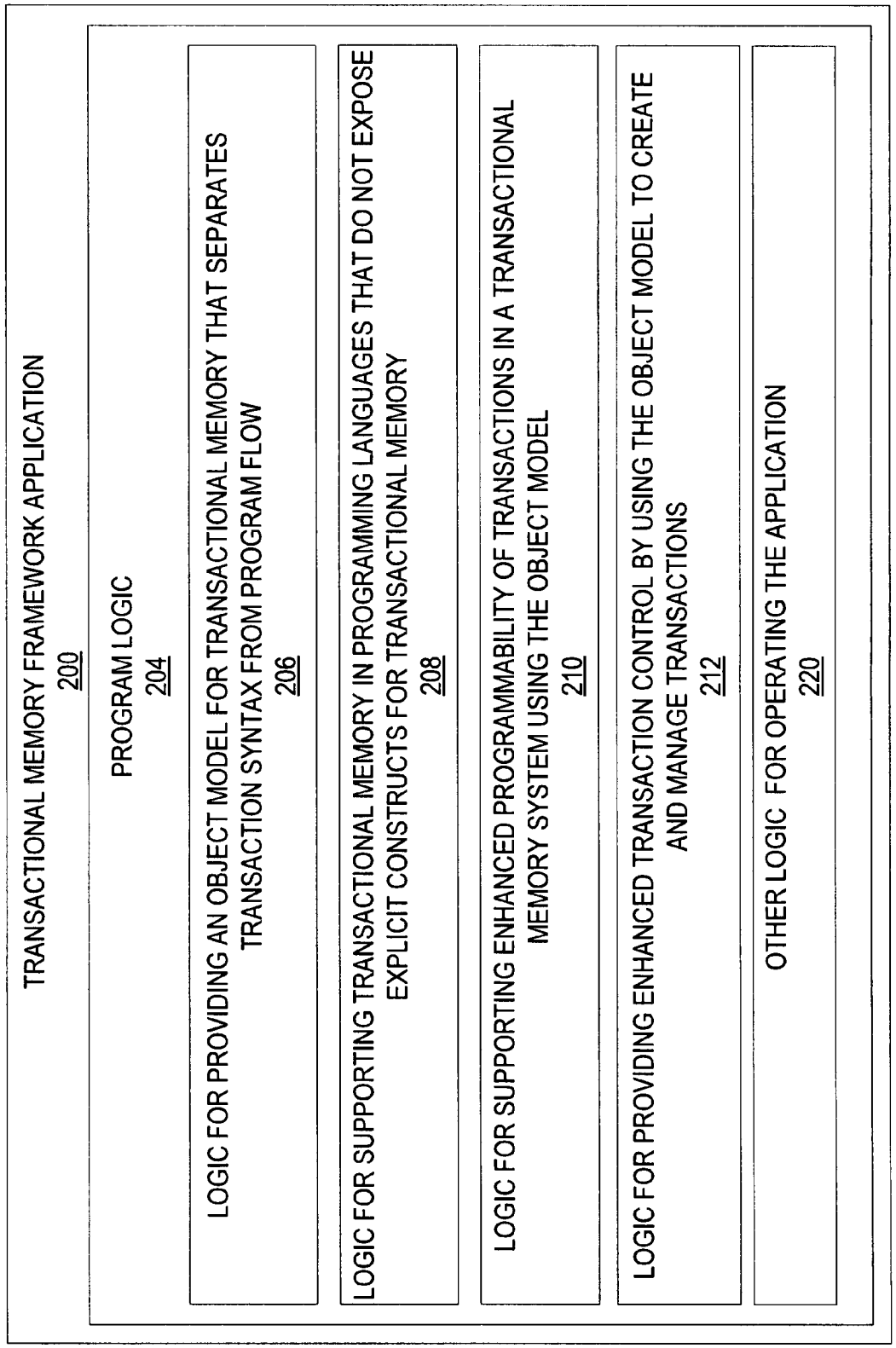
FIG. 2 is a diagrammatic view of a transactional memory framework application of one implementation operating on the computer system of FIG. 1.

Turning now to FIG. 2 with continued reference to FIG. 1, a transactional memory framework application 200 operating on computing device 100 is illustrated. Transactional memory framework application 200 is one of the application programs that reside on computing device 100. However, it will be understood that transactional memory framework application 200 can alternatively or additionally be embodied as computer-executable instructions on one or more computers and/or in different variations than shown on FIG. 1. Alternatively or additionally, one or more parts of transactional memory framework application 200 can be part of system memory 104, on other computers and/or applications 115, or other such variations as would occur to one in the computer software art.

Transactional memory framework application 200 includes program logic 204, which is responsible for carrying out some or all of the techniques described herein. Program logic 204 includes logic for providing an object model for transactional memory that separates transaction syntax from program flow 206; logic for supporting transactional memory in programming languages that do not expose explicit constructs for transactional memory using the object model 208; logic for supporting enhanced programmability of transactions in a transactional memory system using the object model 210; logic for providing enhanced transaction control by using the object model to create and manage transactions 212; and other logic for operating application 220. In one implementation, program logic 204 is operable to be called programmatically from another program, such as using a single call to a procedure in program logic 204.

Figure 3:
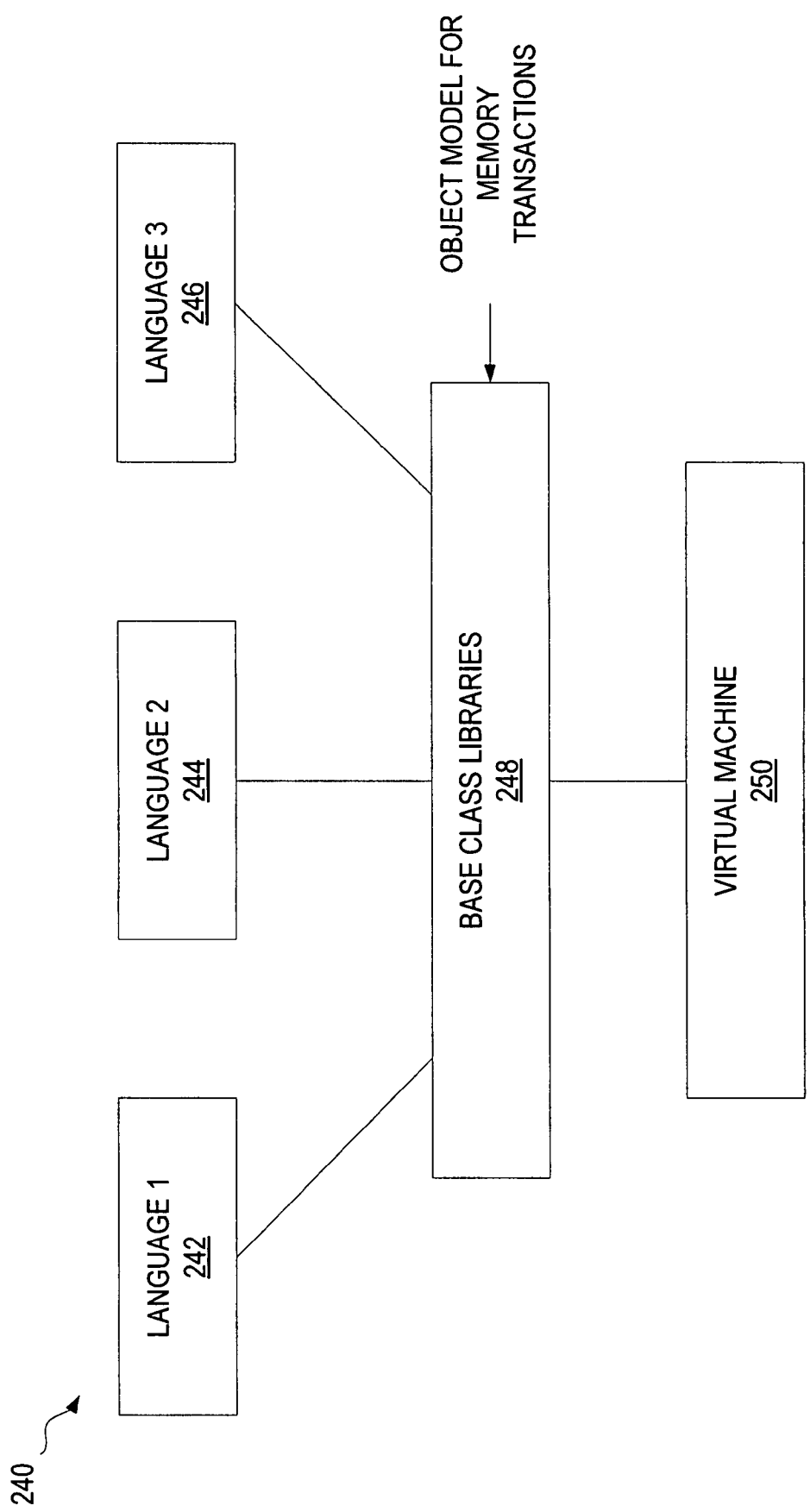
FIG. 3 is a diagrammatic view for one implementation illustrating that an object model for memory transactions can be implemented in a base class library.

FIG. 3 is a diagrammatic view 240 illustrating that an object model for memory transactions can be implemented in one or more base class libraries 248 that are used by virtual machine 250. Multiple languages (242, 244, and 246) can then access the object model, whether or not a respective one of the languages has support for memory transaction constructs from directly within the language.

Figure 4:
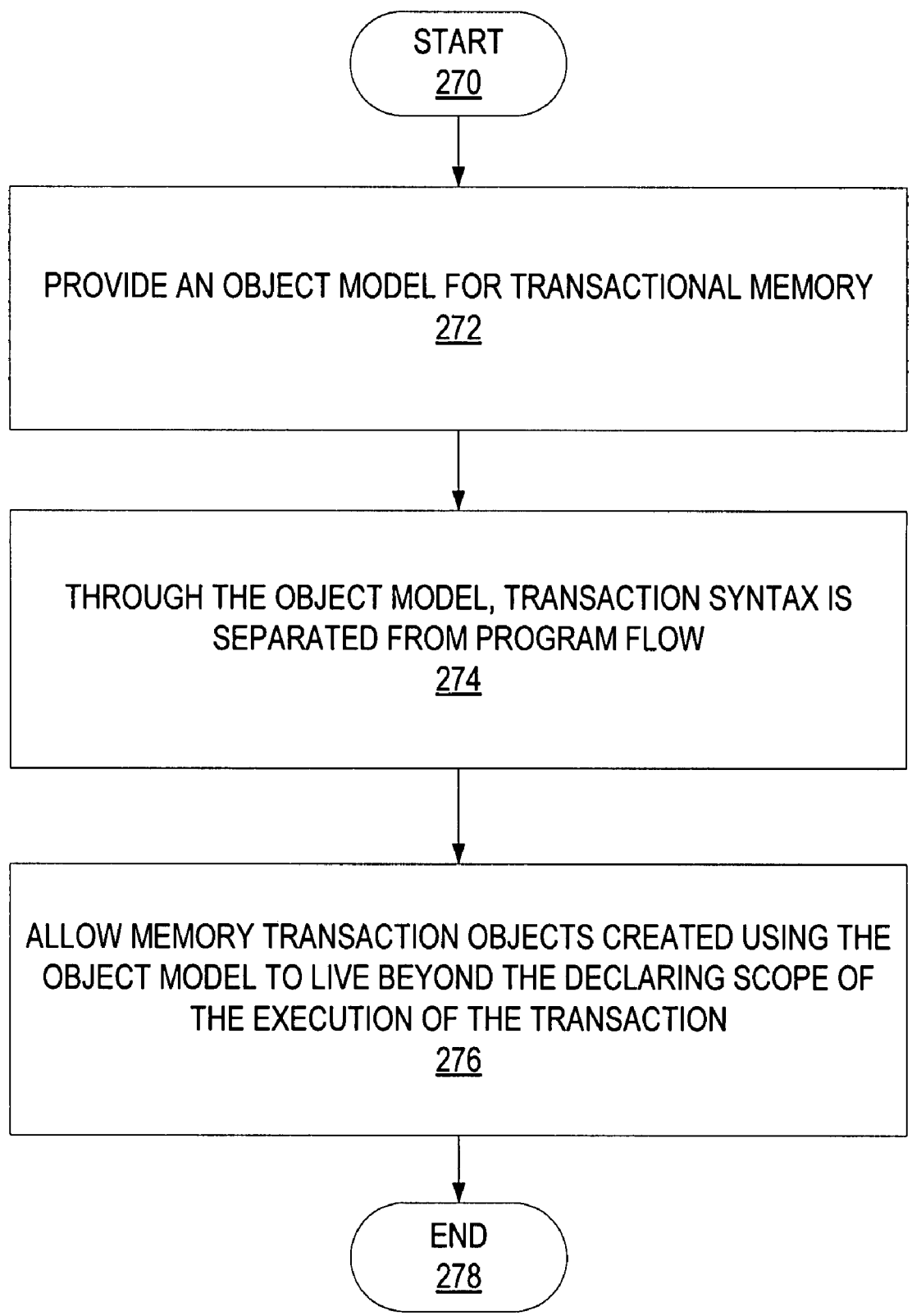
FIG. 4 is a process flow diagram for one implementation of the system of FIG. 1 illustrating the stages involved in providing an object model for transactional memory.

Turning now to FIGS. 4-12 with continued reference to FIGS. 1-2, the stages for implementing one or more implementations of transactional memory framework application 200 are described in further detail. In some implementations, the processes of FIGS. 4-12 are at least partially implemented in the operating logic of computing device 100. FIG. 4 illustrates one implementation of the stages involved in providing an object model for transactional memory. The process begins at start point 270 with providing an object model for transactional memory (stage 272). Through the object model, the transaction syntax is separated from program flow (stage 274). Memory transactions objects can be created using the object model that live beyond the scope of the execution of the declaring scope (stage 276). This extended lifetime provides for additional features that are discussed in further detail herein. The process ends at end point 278.

Figure 5:
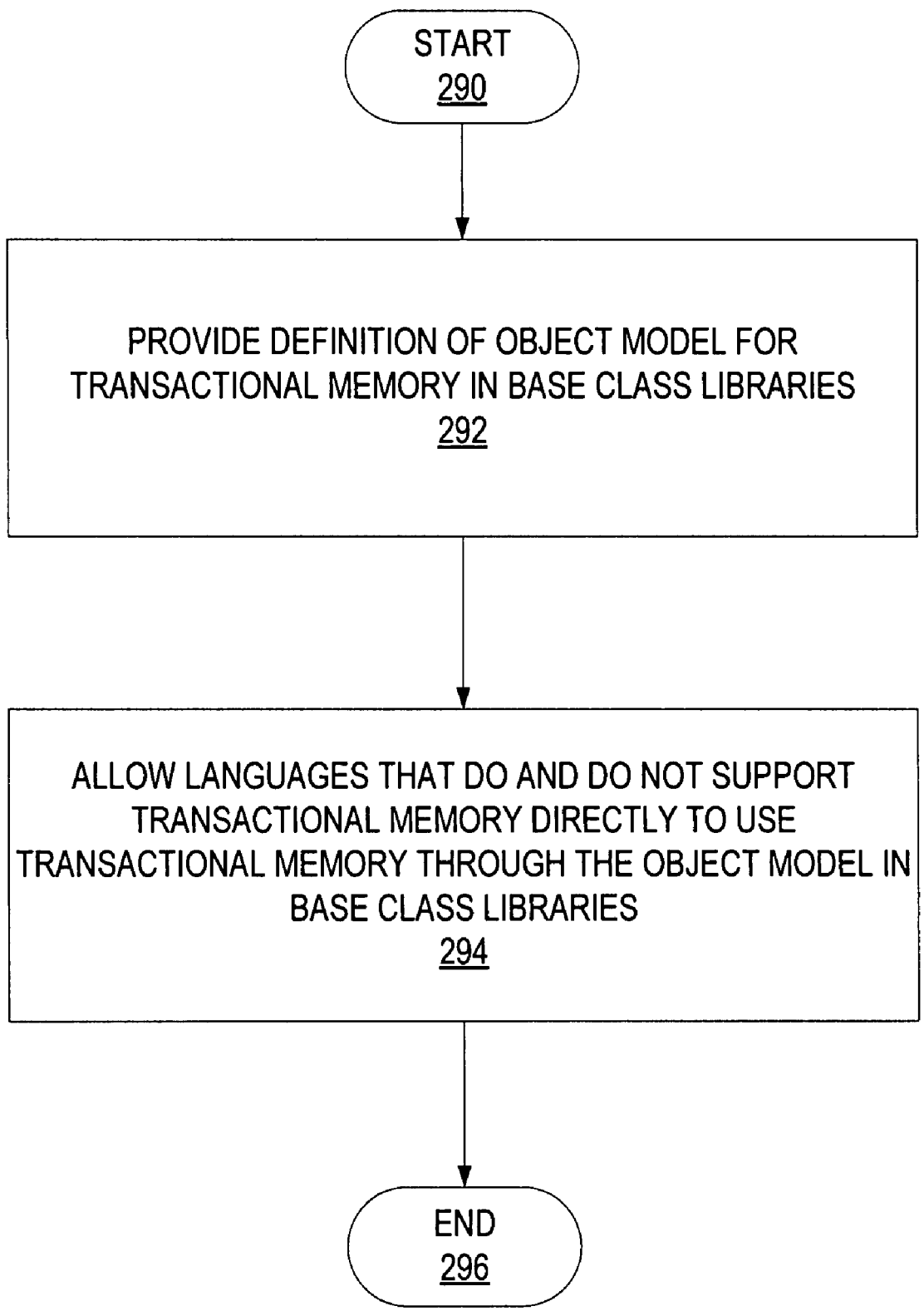
FIG. 5 is a process flow diagram for one implementation of the system of FIG. 1 illustrating the stages involved in providing support for transactional memory even from languages that do not expose transactional memory constructs.

FIG. 5 illustrates one implementation of the stages involved in providing support for transactional memory even from languages that do not expose transactional memory constructs. The process begins at start point 290 with providing a definition of an object model for transactional memory in one or more base class libraries (stage 292). The system allows languages that do and do not support transactional memory to use transactional memory through the object model in the base class libraries (stage 294). The process ends at end point 296.

FIG. 6 is a diagram 310 illustrating an example of a skeletal definition of a memory transaction class of one implementation. The memory transaction class 312 shown in FIG. 6 illustrates definitions for a top level memory transaction 314, for a nested memory transaction 316, various methods to read and write to the transaction 318, methods for controlling the transaction 320, properties that return the current ambient transaction hierarchy 322, and a thread local value 324. As described in further detail in later figures, by providing the memory transactions using an object model, additional features and enhancements can be achieved that are not tied to the program flow.

Figure 7:
FIG. 7 is a diagram illustrating some exemplary source code of one implementation for declaring and using memory transactions through the object model.

FIG. 7 is a diagram 340 illustrating some exemplary source code of one implementation for declaring and using memory transactions from the object model. In the example shown, a new memory transaction is declared, and then various methods on the object are invoked, such as the write method and the commit method.

Figure 8:
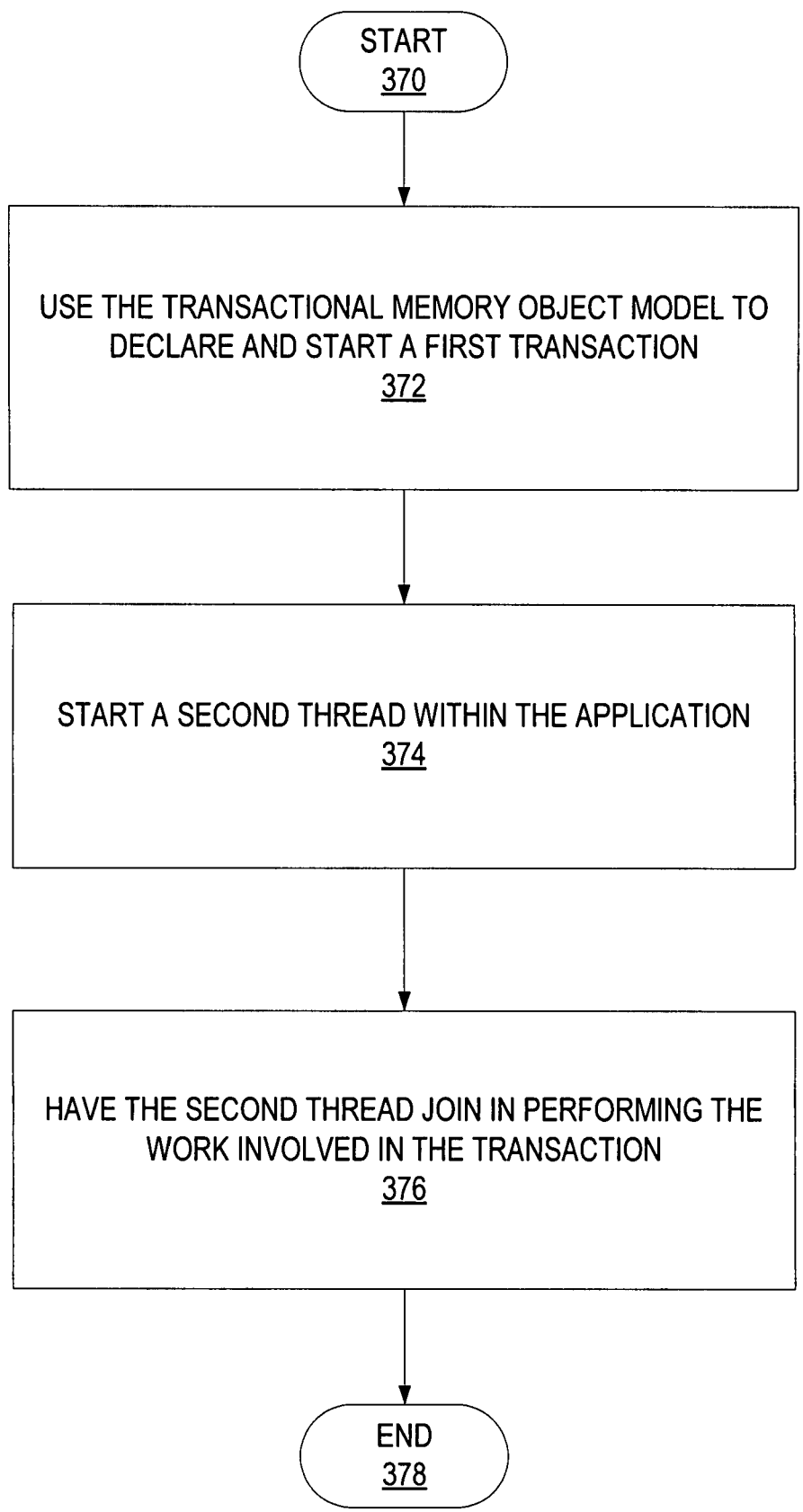
FIG. 8 is a process flow diagram for one implementation of the system of FIG. 1 that illustrates the stages involved in starting another thread and having it assist in performing work within a transaction.

FIG. 8 illustrates one implementation of the stages involved in starting another thread and having it assist in performing work. The process begins at start point 370 using the transactional memory object model to declare and start a transaction (stage 372). A second thread is initiated (stage 374) which then joins in and participates in the transaction (stage 376). The process ends at end point 378.

FIG. 9 is a diagram 400 illustrating some exemplary source code for using the object model to create a single transaction with multiple threads that contribute to performing the work for the single transaction. In the example shown, a memory transaction 402 is created, and then a new thread is started 404 which can assist in performing part of the work.

Figure 10:
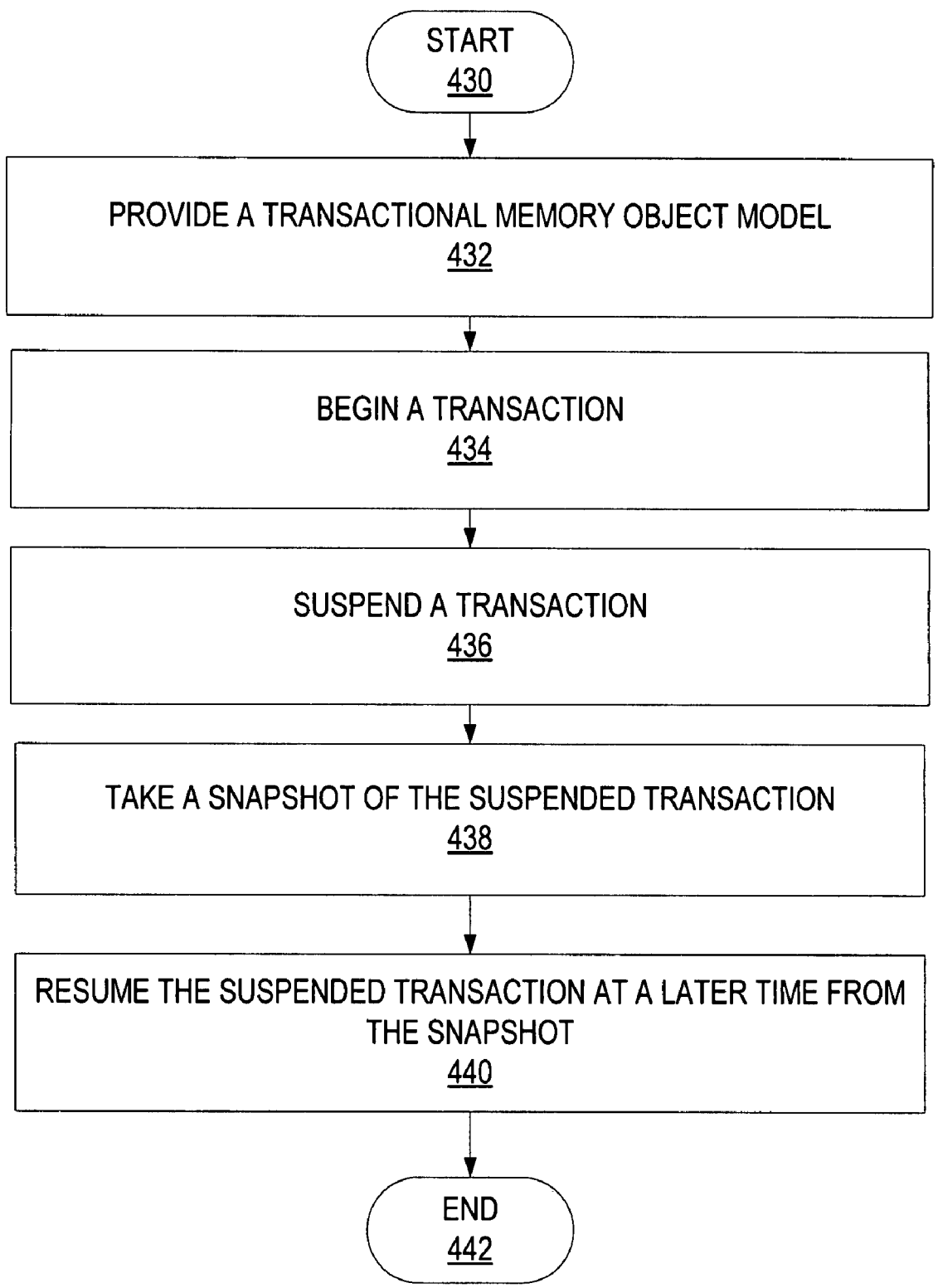
FIG. 10 is a process flow diagram for one implementation of the system of FIG. 1 that illustrates the stages involved in suspending and resuming a transaction at a later time.

FIG. 10 illustrates one implementation of the stages involved in suspending and resuming a transaction at a later time. The process begins at start point 430 with providing a transactional memory object model (stage 432). The system begins a transaction (stage 434), and then later suspends that same transaction (stage 436). The system takes a snapshot of the suspended transaction (stage 438) to allow it to be resumed later. The system then resumes the suspended transaction at a later time from the snapshot (stage 440). The process ends at end point 442.

FIG. 11 is a diagram 460 illustrating some exemplary source code to further illustrate the stages of FIG. 10. In the example shown, a transaction is suspended, a snapshot of the transaction object is captured, and then the transaction is resumed at a later time.

Figure 12:
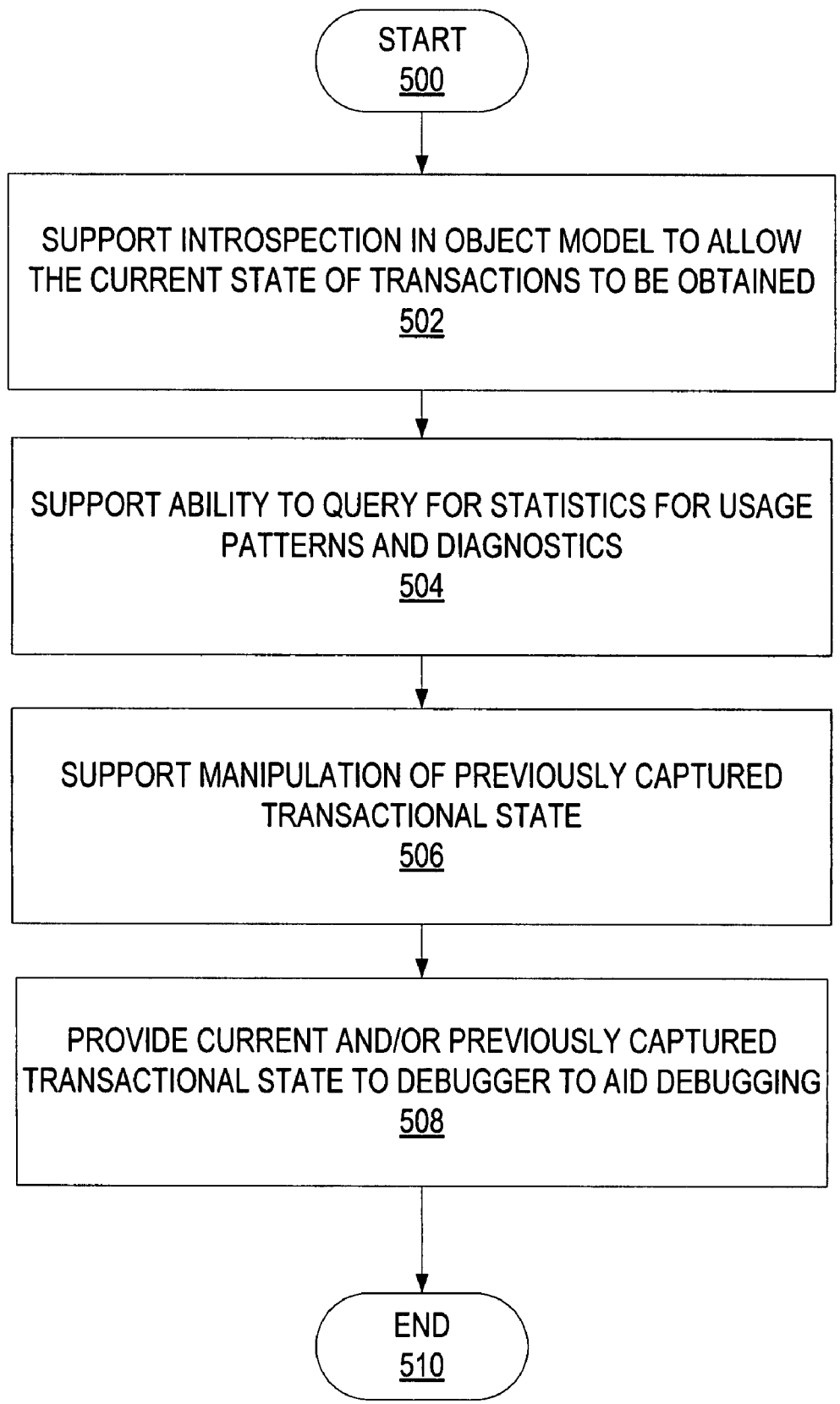
FIG. 12 is a process flow diagram for one implementation of the system of FIG. 1 that illustrates the stages involved in providing enhanced transactional functionality by using an object model to support transactional memory.

FIG. 12 illustrates one implementation of the stages involved in providing enhanced transaction details by using an object model to create transactions. While these stages are described in a flow diagram, no particular order is intended for these features. Furthermore, some, all, and/or additional features can be supported using the object model than those described in FIG. 12. The process begins at start point 500 with supporting introspection in the object model to allow the current state of transactions to be obtained (stage 502). The system supports the ability to query for statistics for usage patterns and diagnostics of transactions (stage 504). For example, the amount of data written to certain transactions can be calculated. The system supports manipulation of previously captured transactional state (stage 506), such as analyzing one or more values that were captured as the transactions executed. The system can provide current and/or previously captured transactional state to a debugger to aid in debugging (stage 508). The process ends at end point 510.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the examples discussed herein could be organized differently on one or more computers to include fewer or additional options or features than as portrayed in the examples.

What is claimed is:

1. A computer-readable storage medium having computer-executable instructions for causing a computer to perform steps comprising:
providing an object model for transactional memory, wherein transactional memory is a concurrency control for controlling access to shared memory in concurrent computing, the object model allowing transaction syntax to be separated from program flow; and
allowing memory transaction objects created using the object model to live beyond an instantiating execution scope, thereby allowing additional properties about the memory transaction to be manipulated.

2. The computer-readable storage medium of claim 1, wherein the object model is operable to support transactional memory in programming languages that do not expose transactional memory constructs.

3. The computer-readable storage medium of claim 1, wherein the object model is implemented in one or more base class libraries of a framework.

4. The computer-readable storage medium of claim 1, wherein the object model is operable to allow memory transaction objects created from the object model to live beyond an instantiating execution scope.

5. The computer-readable storage medium of claim 1, wherein the object model provides a constructor for creating a top level transaction.

6. The computer-readable storage medium of claim 1, wherein the object model provides a constructor for creating a nested transaction.

7. The computer-readable storage medium of claim 1, wherein the object model provides methods for performing transactional reads and writes.

8. The computer-readable storage medium of claim 1, wherein the object model provides methods for transaction control.

9. The computer-readable storage medium of claim 1, wherein a transaction is a piece of code that executes a series of reads and writes to shared memory.

10. A method for providing an object model for transactional memory comprising the steps of:
providing an object model for transactional memory, wherein transactional memory is a concurrency control for controlling access to shared memory in concurrent computing, the object model allowing transactional semantics to be separated from program flow; and
allowing memory transaction objects created using the object model to live beyond an instantiating execution scope, thereby allowing additional properties about the memory transaction to be manipulated.

11. The method of claim 10, wherein the additional properties include a current state of one or more of the transactions.

12. The method of claim 10, wherein the additional properties include statistics for usage patterns for one or more of the transactions.

13. The method of claim 10, wherein the additional properties include statistics for diagnostics for one or more of the transactions.

14. The method of claim 10, wherein the additional properties include previously captured transactional state for one or more of the transactions.

15. The method of claim 10, wherein the additional properties are provided to a debugger to aid in debugging.

16. The method of claim 15, wherein the additional properties include previously captured transactional state of one or more of the transactions.

17. The method of claim 15, wherein the additional properties include current transactional state of one or more of the transactions.

18. A computer-readable storage medium having computer-executable instructions for causing a computer to perform the steps recited in claim 10.

19. A method for providing support for transactional memory from languages that do not directly expose transactional memory constructs comprising the steps of:

defining an object model for transactional memory in at least one base class library; and allowing a language that does not support transactional memory directly to use transactional memory through the object model; and allowing memory transaction objects created using the object model to live beyond an instantiating execution scope, thereby allowing additional properties about the memory transaction to be manipulated.

20. The method of claim 19, wherein the object model allows the language to declare and use memory transaction objects.

* * * * *